United States Patent
Kanazashi

(10) Patent No.: US 7,148,826 B2
(45) Date of Patent: Dec. 12, 2006

(54) DATA INPUT CIRCUIT AND SEMICONDUCTOR DEVICE UTILIZING DATA INPUT CIRCUIT

(75) Inventor: Kazuyuki Kanazashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 930 days.

(21) Appl. No.: 09/777,899

(22) Filed: Feb. 7, 2001

(65) Prior Publication Data

US 2001/0012290 A1    Aug. 9, 2001

(30) Foreign Application Priority Data

Feb. 8, 2000    (JP)    ............... 2000-030803

(51) Int. Cl.
*H03M 9/00*    (2006.01)

(52) U.S. Cl. ............... 341/100; 365/189.12; 710/71; 711/109

(58) Field of Classification Search ............... 370/366, 370/360, 428, 487, 486, 465, 537; 365/240, 365/189.12; 341/100; 725/32; 710/71
See application file for complete search history.

(56) References Cited

U.S. PATENT DOCUMENTS

| | | | | |
|---|---|---|---|---|
| 4,858,190 A | * | 8/1989 | Yamaguchi et al. ... | 365/189.05 |
| 4,870,621 A | * | 9/1989 | Nakada ............... | 365/230.05 |
| 4,903,240 A | * | 2/1990 | Von Flue .............. | 365/189.02 |
| 4,985,872 A | * | 1/1991 | Halbert, III ........... | 365/230.09 |
| 5,017,809 A | * | 5/1991 | Turner ................. | 326/38 |
| 5,282,164 A | * | 1/1994 | Kawana ................ | 365/189.12 |
| 5,337,050 A | * | 8/1994 | Sugawara .............. | 341/100 |
| 5,596,540 A | * | 1/1997 | Diem et al. ........... | 365/221 |
| 5,596,724 A | * | 1/1997 | Mullins et al. ........ | 710/71 |
| 5,668,772 A | * | 9/1997 | Hotta .................. | 365/230.06 |
| 5,774,079 A | * | 6/1998 | Zirngibl ............... | 341/100 |
| 5,777,946 A | * | 7/1998 | Inuzuka et al. ........ | 365/240 |
| 5,789,736 A | * | 8/1998 | Kawahara ............. | 250/208.1 |
| 5,862,367 A | * | 1/1999 | Chiao-Yen ............ | 710/71 |
| 5,926,120 A | * | 7/1999 | Swenson et al. ....... | 341/100 |
| 6,055,022 A | * | 4/2000 | Hush ................... | 348/529 |
| 6,091,348 A | * | 7/2000 | Crayford .............. | 341/100 |
| 6,092,165 A | * | 7/2000 | Bolyn .................. | 711/167 |
| 6,128,244 A | * | 10/2000 | Thompson et al. .... | 365/230.03 |
| 6,259,387 B1 | * | 7/2001 | Fukazawa ............. | 341/100 |
| 6,438,054 B1 | * | 8/2002 | Kanazashi ............ | 365/219 |
| 6,509,851 B1 | * | 1/2003 | Clark et al. ........... | 341/100 |

* cited by examiner

*Primary Examiner*—Doris H. To
*Assistant Examiner*—Steven Blount
(74) *Attorney, Agent, or Firm*—Arent Fox PLLC

(57) ABSTRACT

A data input circuit converts input serial data to n-bit parallel data, and outputs the n-bit parallel data by following an address signal. The data input circuit includes a data shifting unit including a plurality of columns, and sequentially shifting the input serial data through the plurality of columns; and a selection unit selecting a column among the plurality of columns as an input column by following the address signal, wherein the input serial data is inputted to the data shifting unit through the input column. Thus, the data input device can speed up its processing speed with a simplified circuit structure whose circuit size is reduced.

10 Claims, 15 Drawing Sheets

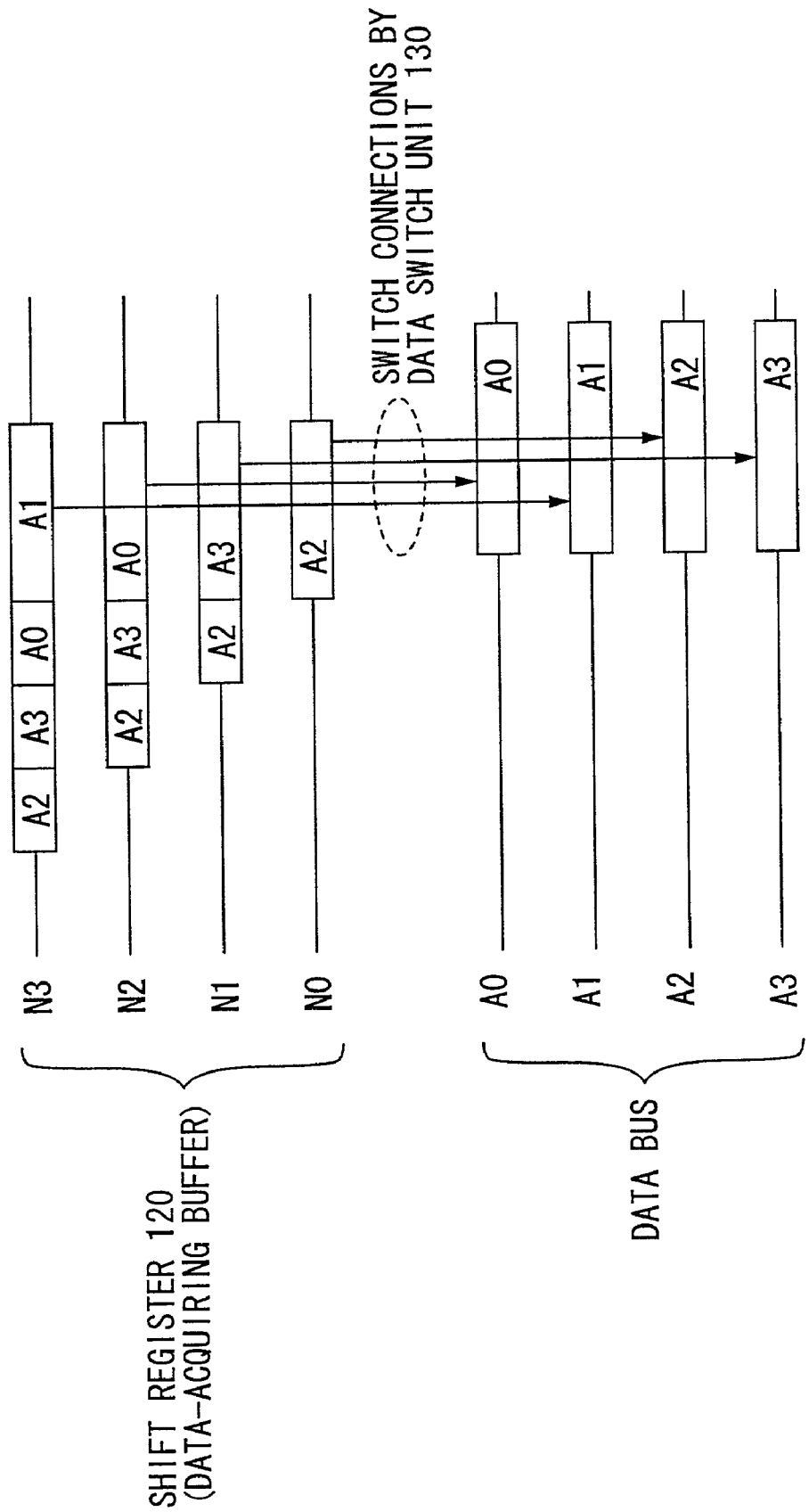

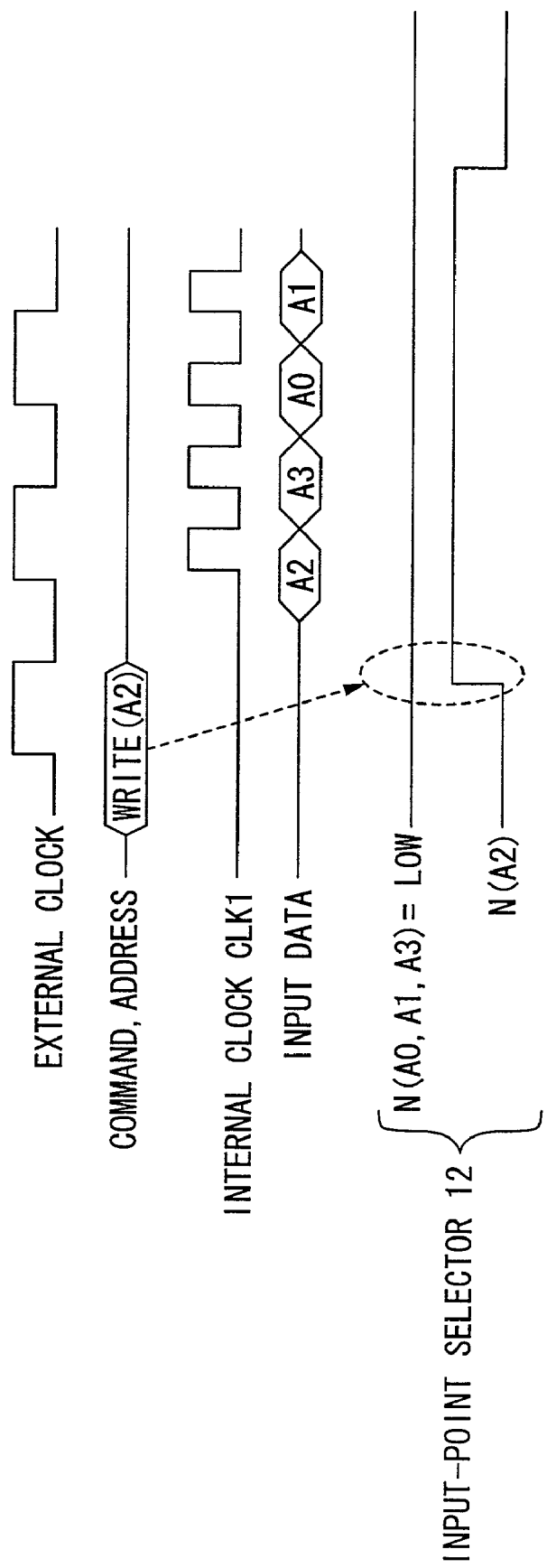

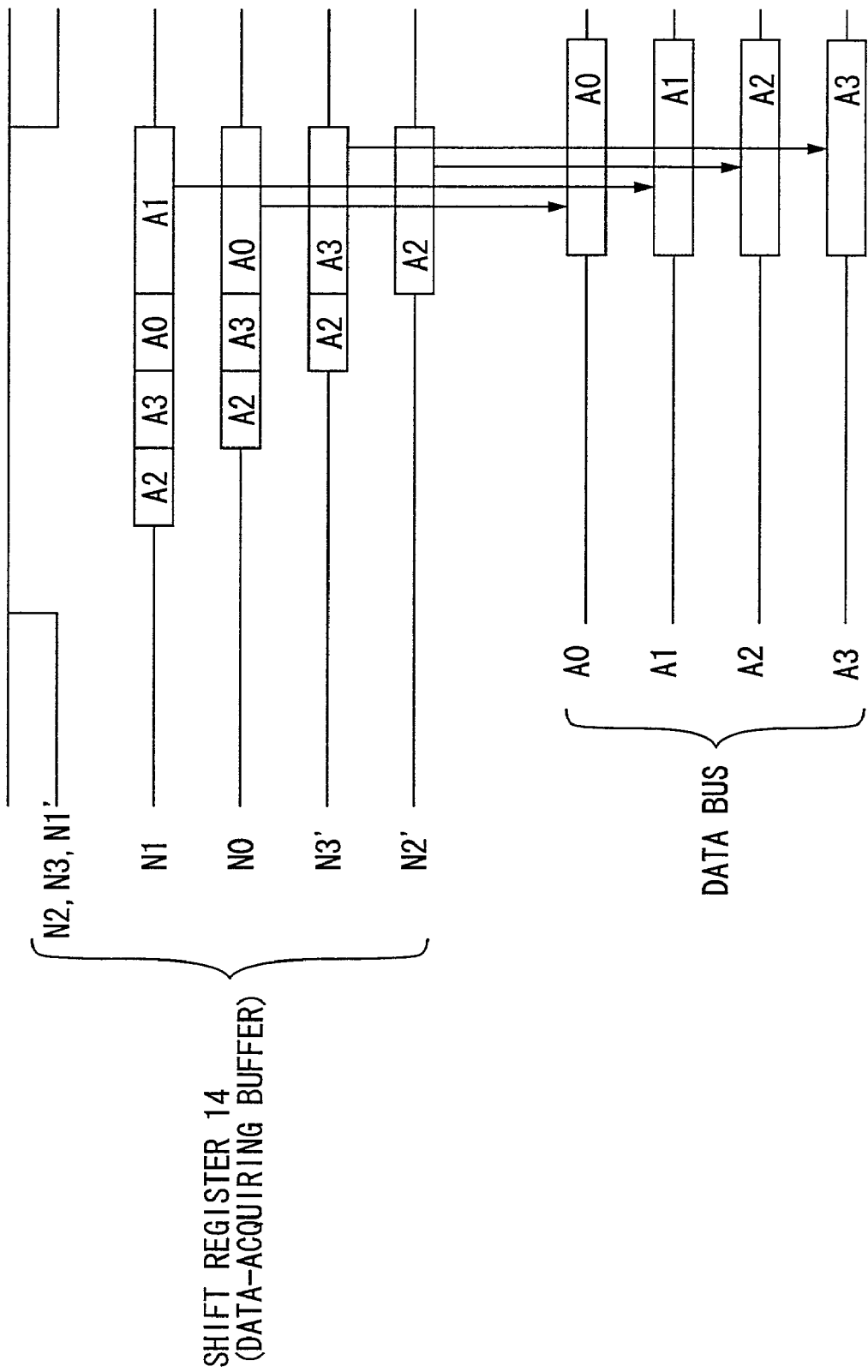

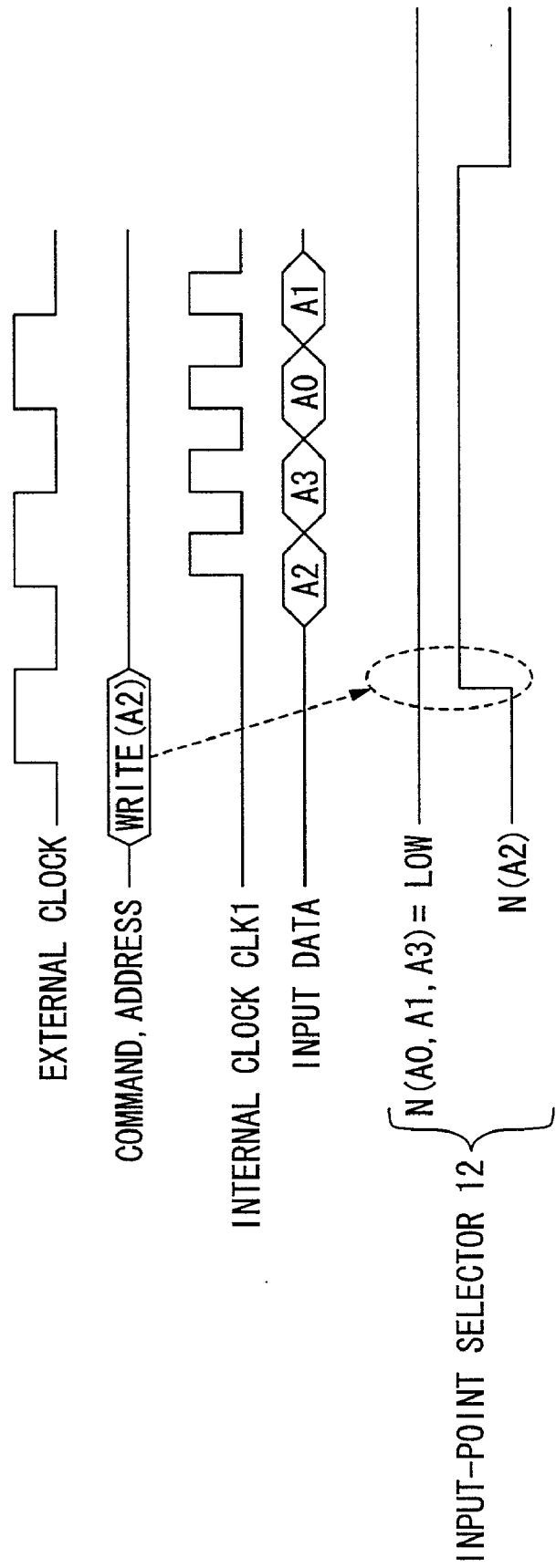

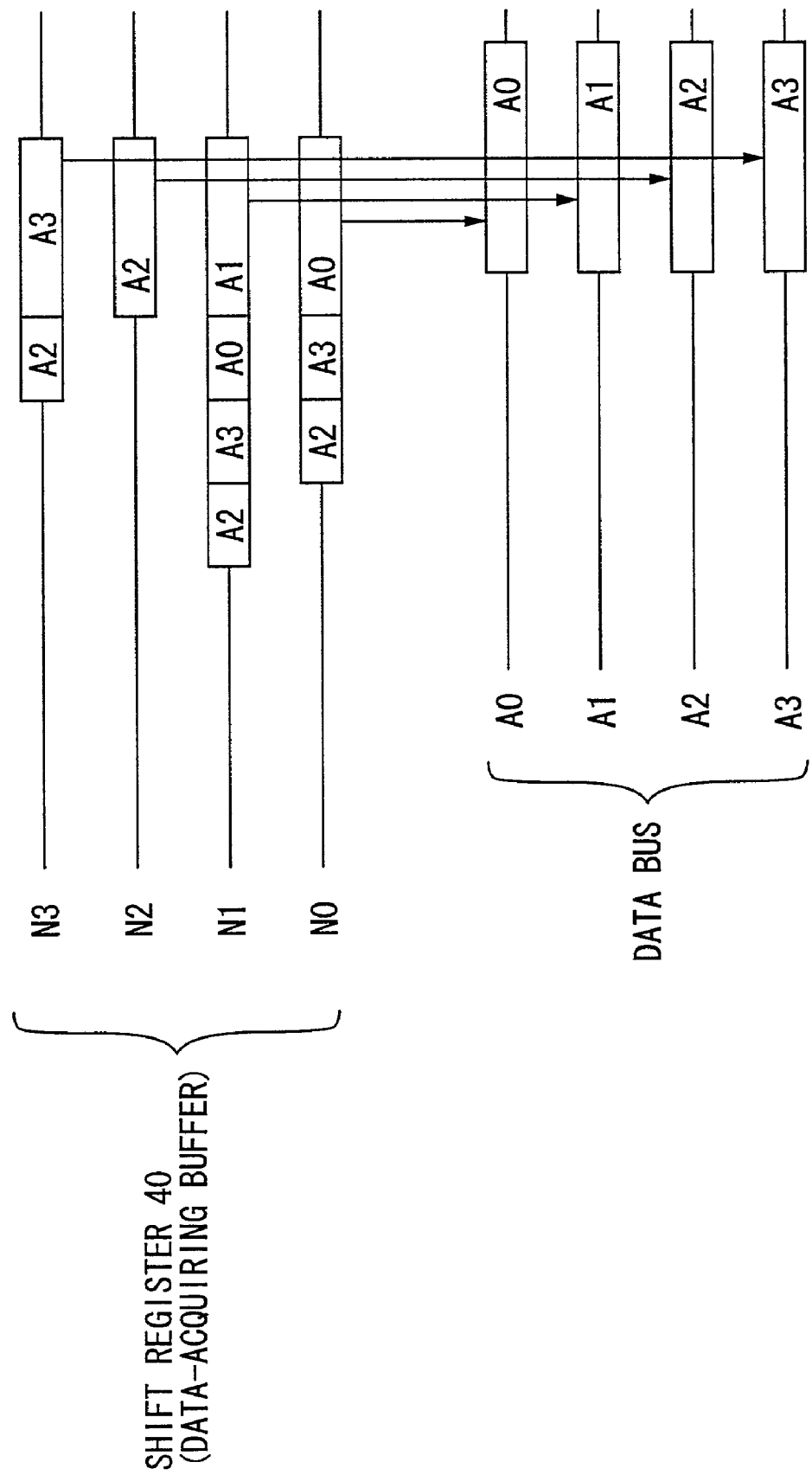

DATA INPUT CIRCUIT AND SEMICONDUCTOR DEVICE UTILIZING DATA INPUT CIRCUIT

BACKGROUND OF THE INVENTION

1. Field of the Invention

The present invention relates to a data input circuit and a semiconductor device utilizing the data input circuit. The present invention more particularly relates to a data input circuit receiving serial data synchronously to a clock, and converting the serial data to parallel data, and a semiconductor device utilizing the data input circuit.

2. Description of the Related Art

Some semiconductor devices include an input circuit converting serial data supplied from outside the semiconductor devices to parallel data, and outputting the parallel data to a data bus by following an address signal. The input circuit creates a plurality of address signals from a single address signal supplied in accordance with a command signal, and outputs the parallel data to the data bus by following the plurality of address signals.

FIG. 1 is a diagram showing a configuration of a conventional input circuit. An input circuit 100 includes an input buffer 110, a shift register 120 (a data-acquiring buffer) and a data switch unit 130. The data switch unit 130 includes switches 131 through 134. Additionally, FIGS. 2A and 2B are diagrams showing signal processes performed by the input circuit 100. It should be noted that FIGS. 1, 2A and 2B show a case in which data is supplied to the input circuit 100 by a DDR (Double Data Rate) method supplying the data with a frequency twice as higher than that of an external clock, for instance.

An address signal A2 is initially supplied to the input circuit 100 with a data-write command as shown in FIG. 2A. The address signal A2 is one of address signals A0, A1, A2 and A3 expressed by a combination of the least two significant bits (Y1, Y0) of an address. Additionally, the address signal A2 supplied with the data-write command to the input circuit 100 indicates that input data is supplied to the input circuit 100 in order of data A2, data A3, data A0 and data A1 continuously after the address signal A2 and the data-write command have been supplied. To be concrete, the data A2, A3, A0 and A1 is supplied through the input buffer 110 to the shift register 120 in the order of the data A2, A3, A0 and A1 by following a frequency of an internal clock CLK1. The shift register 120 shifts data supplied thereto one by one as shown in FIG. 2B. For example, if an address signal supplied with the data-write command to the input circuit 100 is the address signal A2, the shift register 120 stores the data A2, A3, A0 and A1 respectively in areas N0, N1, N2 and N3 of the shift register 120.

The areas N0, N1, N2 and N3 of the shift register 120 are respectively connected to the switches 131, 132, 133 and 134 included in the data switch unit 130. The switches 131 through 134 are connected to data buses A0 through A3. The input circuit 100 outputs input data to a data bus corresponding to a supplied address signal by controlling the switches 131 through 134 by following the supplied address signal. For example, in the case in which an address signal supplied with the data-write command to the input circuit 100 is the address signal A2, the areas N0, N1, N2 and N3 are respectively connected with the data buses A2, A3, A0 and A1 as shown in FIG. 2B. As described above, the input circuit 100 creates a group of four address signals, each address signal corresponding to a combination of the least two significant bits of an address, automatically recognizes an order of four input data, and outputs the four input data to their corresponding data buses. Such an operation is called a 4N operation.

As described above, the input circuit 100 needs to include a large number of switches in the data switch unit 130. The data switch unit 130 needs to have $(2^n)^2$ switches in a case of creating a group of $2^n$ address signals, each address signal corresponding to a combination of the least "n" significant bits of an address, automatically recognizing an order of $2^n$ input data, and outputting the $2^n$ input data to their corresponding data buses. For instance, in the 4N operation, the data switch unit 130 needs to have $4^2$ switches. Consequently, a circuit area of the input circuit 100 increases by a larger amount as the number of input data increases. Additionally, the configuration of the input circuit 100 becomes more complicated.

FIG. 3 is a diagram showing a configuration of another conventional input circuit. An input circuit 200 shown in FIG. 3 includes the input buffer 110, data-acquiring buffers 140 (N0) through 143 (N3), and an address counter 150. Additionally, FIGS. 4A, 4B and 4C are diagrams showing signal processes performed by the input circuit 200. The input circuit 200 achieves the 4N operation by controlling a data-acquiring clock supplied to the data-acquiring buffers 140 through 143 that are provided for the input data A0 through A3.

The address signal A2 is initially supplied to the input circuit 200 with the data-write command as shown in FIG. 4A. The address counter 150 generates data-acquiring clocks 1 through 4 by following the address signal A2 as shown in FIG. 4B, and supplies the data-acquiring clocks to the data-acquiring buffers 140 through 143. To be concrete, the data-acquiring clocks 1, 2, 3 and 4 are respectively supplied to the data-acquiring buffers 140, 141, 142 and 143. The data-acquiring buffers 140 through 143 obtain the input data A0 through A3 respectively at rising edges of the data-acquiring clocks 1 through 4 as shown in FIG. 4C. Subsequently, the data-acquiring buffers 140 through 143 outputs obtained input data, for example, the input data A0 through A3 respectively to the data buses A1 through A3.

The input circuit 200 shown in FIG. 3 needs to generate the data-acquiring clocks at the highest frequency possible. However, since a logical circuit such as the address counter 150 must generate the data-acquiring clocks, speed up of processes executed by the input circuit 200 is hard.

SUMMARY OF THE INVENTION

Accordingly, it is a general object of the present invention to provide a data input circuit and a semiconductor device utilizing the data input circuit. A more particular object of the present invention is to provide a data input device speeding up its processing speed with a simplified circuit structure reducing a circuit size, and a semiconductor device utilizing the data input device, in which the disadvantages described above are eliminated.

The above-described object of the present invention is achieved by a data input circuit converting input serial data to n-bit parallel data, and outputting the n-bit parallel data by following an address signal, the data input circuit including a data shifting unit including a plurality of columns, and sequentially shifting the input serial data through the plurality of columns; and a selection unit selecting a column among the plurality of columns as an input column by following the address signal, wherein the input serial data is inputted to the data shifting unit through the input column.

The selection unit selects the column to input the input serial data to the data shifting unit. Subsequently, the data shifting unit obtains the input serial data, and shifts the input serial data so that the input serial data stored in each column of the data shifting unit can be outputted to its corresponding destination.

Thus, the data input device can speed up its processing speed with a simplified circuit structure reducing a circuit size.

Other objects, features and advantages of the present invention will become more apparent from the following detailed description when read in conjunction with the accompanying drawings.

BRIEF DESCRIPTION OF THE DRAWINGS

FIGS. 2A and 2B are diagrams showing signal processes performed by the conventional input circuit;

FIGS. 4A, 4B and 4C are diagrams showing signal processes performed by the conventional input circuit shown in FIG. 3;

FIGS. 6A and 6B are diagrams showing signal processes performed by the input circuit according to the first embodiment;

FIGS. 9A and 9B are diagrams showing signal processes performed by the input circuit according to the second embodiment;

DESCRIPTION OF THE PREFERRED EMBODIMENTS

A description will now be given of preferred embodiments of the present invention, with reference to the accompanying drawings.

Figure 1:
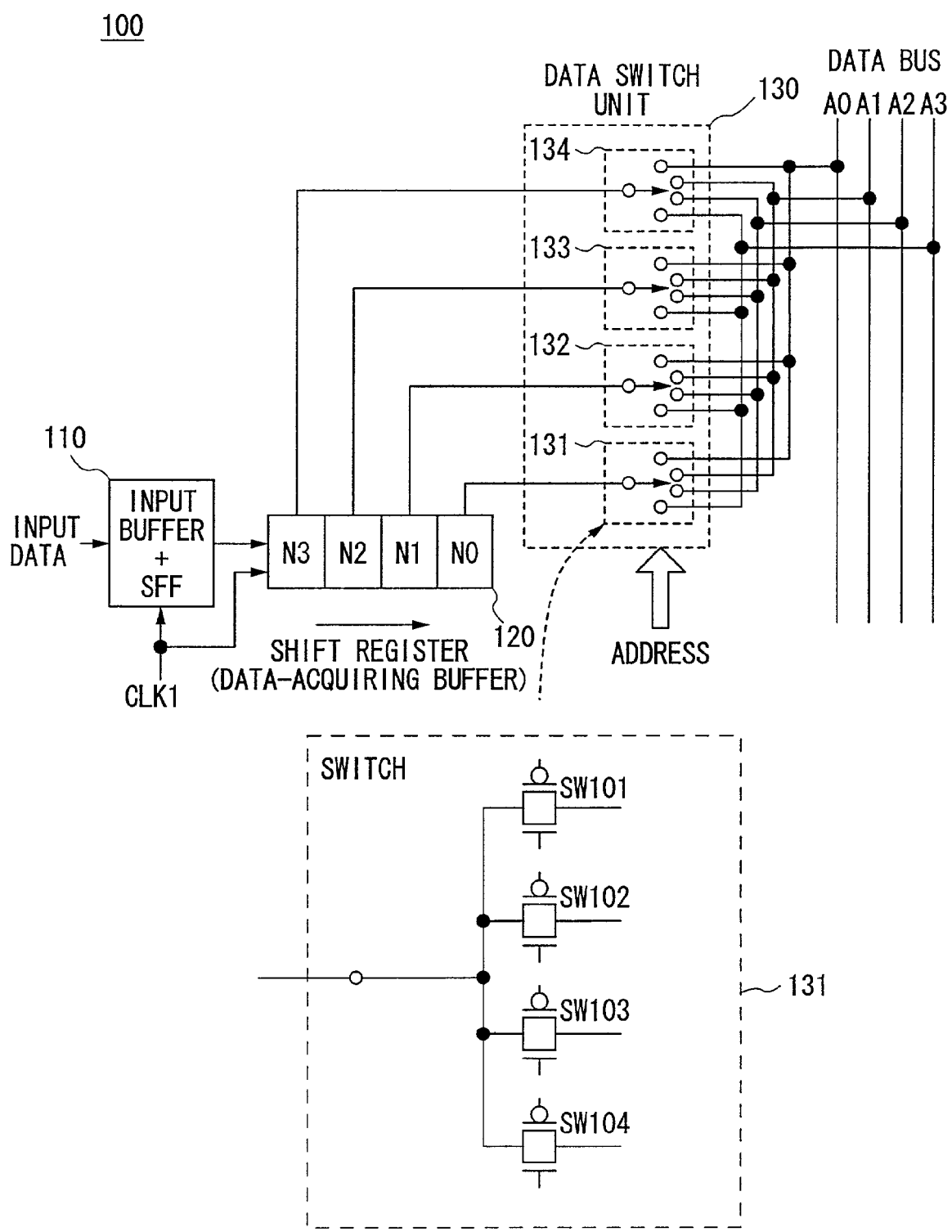
FIG. 1 is a diagram showing a configuration of a conventional input circuit.
Figure 2A:
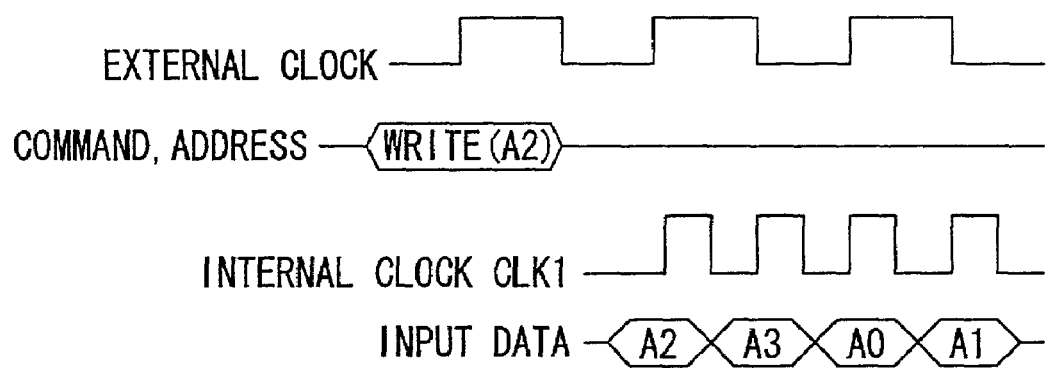
Figure 3:
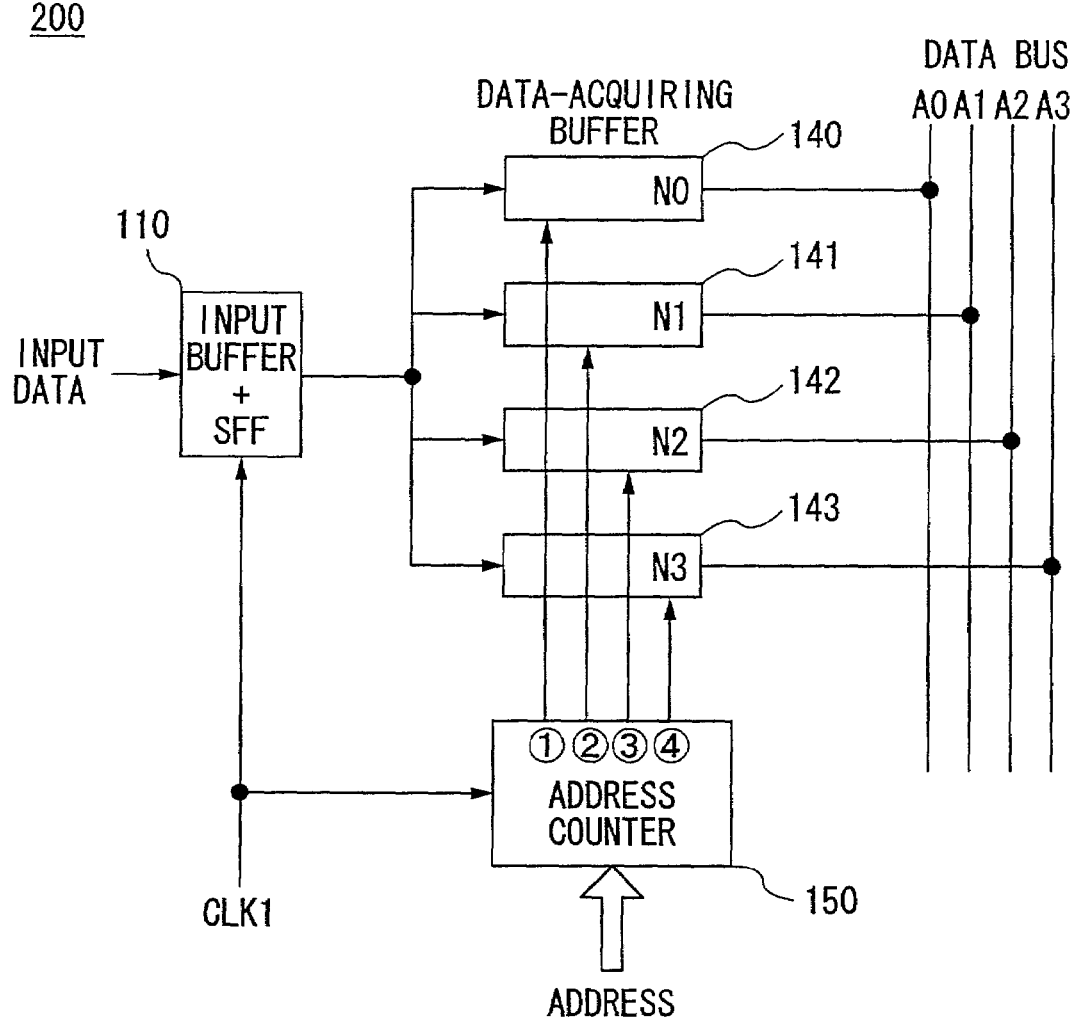
FIG. 3 is a diagram showing a configuration of another conventional input circuit.
Figure 4A:
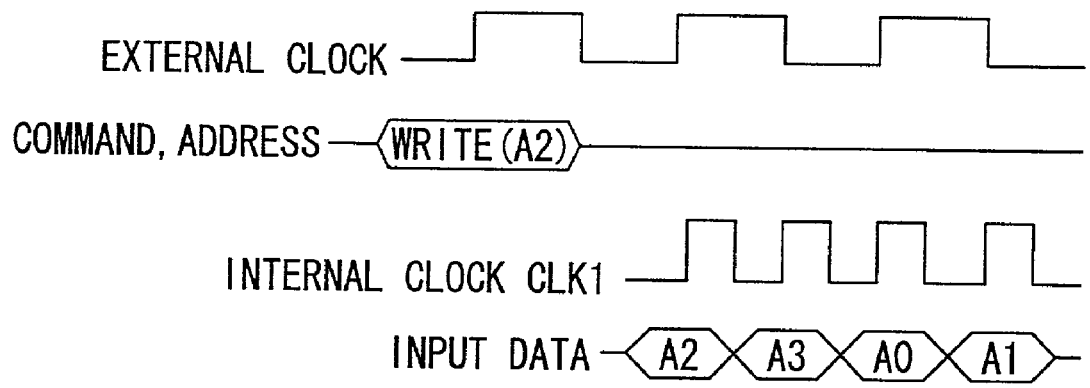
Figure 4B:
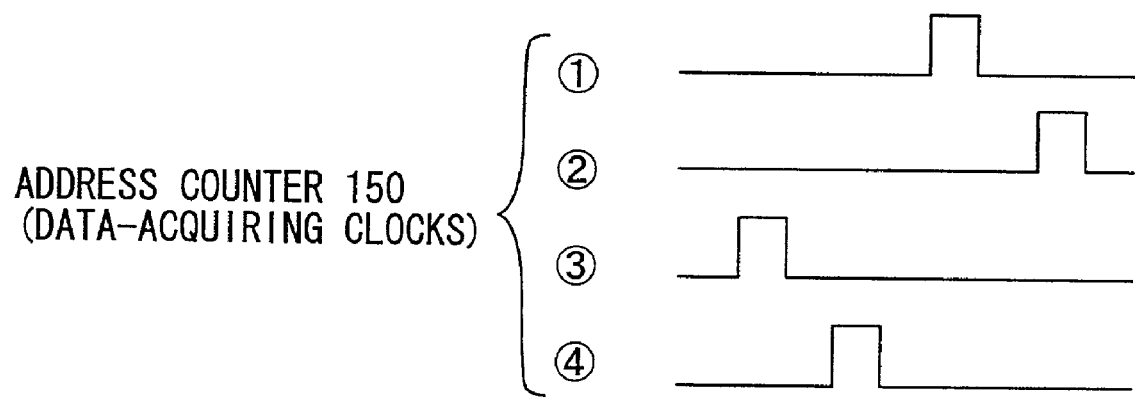
Figure 5:
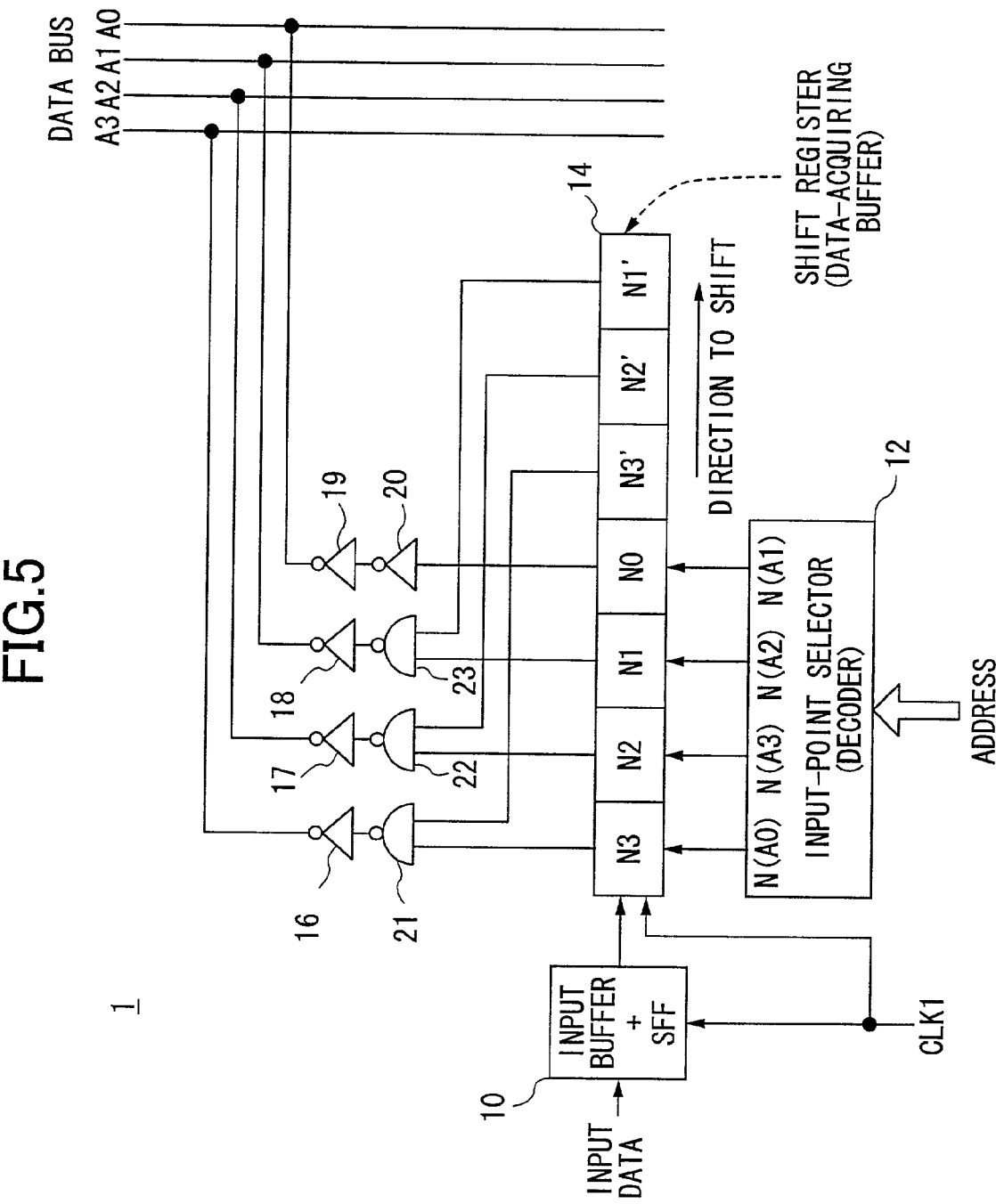
FIG. 5 is a diagram showing a configuration of an input circuit according to a first embodiment of the present invention.

FIG. 5 is a diagram showing a configuration of an input circuit 1 according to a first embodiment of the present invention. The input circuit 1 shown in FIG. 5 includes an input buffer 10, an input-point selector (a decoder) 12, a shift register (a data-acquiring buffer) 14, inverters 16 through 20, and NAND gates 21 through 23. The input circuit 1 generates a plurality of address signals from a single address signal supplied in accordance with a command signal, converts serial data supplied from outside the input circuit 1 to parallel data, and outputs the parallel data to a data bus by following the plurality of address signals.

A description will now be given of a case in which the input circuit 1 creates a group of four address signals, for example, address signals A0 through A3, each address signal corresponding to a combination of the least two significant bits of an address, automatically recognizes an order of four input data, and outputs the four input data to their corresponding data buses A0 through A3. The shift register 14 includes seven columns that are N3, N2, N1, N0, N3', N2' and N1', and shifts input data from the column N3 toward the column N1'. If the input circuit 1 uses a group of $2^n$ address signals in which a number "n" is a natural number, the shift register 14 includes $2^{n+1}-1$ columns. The input-point selector 12 controls a data input point of the shift register 14 by following an address signal inputted thereto. For example, the input-point selector 12 selects the column N1 as the data input point of the shift register 14 in a case in which the address signal A2 is supplied to the input circuit 1 with a data-write command. The columns N3 and N3' of the shift register 14 are connected to the NAND gate 21 whose output terminal is connected to the data bus A3 through the inverter 16. Similarly, the columns N2 and N2' of the shift register 14 are connected to the NAND gate 22 whose output terminal is connected to the data bus A2 through the inverter 17. The columns N1 and N1' of the shift register 14 are connected to the NAND gate 23 whose output terminal is connected to the data bus A1 through the inverter 18. Additionally, the column N0 of the shift register 14 is connected to the data bus A0 through the inverters 20 and 19.

FIGS. 6A and 6B are diagrams showing signal processes performed by the input circuit 1, according to the first embodiment. The address signal A2 is initially supplied with the data-write command to the input circuit 1 as shown in FIG. 6A. The address signal A2 is one of the address signals A0 through A3 expressed by a combination of the least two significant bits (Y1, Y0) of an address. The address signal A2 supplied with the data-write command indicates that the input data is supplied to the input circuit 1 in order of the input data A2, A3, A0 and A1 after the address signal A2 is supplied thereto. If the address signal A3 is supplied with the data-write command to the input circuit 1, the input data is supplied to the input circuit 1 in order of the input data A3, A0, A1 and A2 after the address signal A3 is supplied thereto. The input-point selector 12 selects the column N1 as a data input point of the shift register 14 by following the supplied address signal A2 as shown in FIG. 6A. Subsequently, the input data is supplied to the shift register 14 through the input buffer 10 by following a frequency of an internal clock CLK1 in the order of the input data A2, A3, A0 and A1. Since the input-point selector 12 selects the column N1 of the shift register 14 as the data input point, the input data supplied from the input buffer 10 is inputted to the column N1 continuously in the order of the input data A2, A3, A0 and A1. As a result, the columns N1, N0, N3' and N2' store respectively the input data A1, A0, A3 and A2 as shown in FIG. 6B. The columns N1', N2 and N3 not storing the input data store a predetermined value, for example, a high-level signal or value as shown in FIG. 6B.

The input data A0 stored in the column N0 of the shift register 14 is outputted to the data bus A0 through the inverters 20 and 19. The input data A1 stored in the column N1 of the shift register 14 and a value stored in the column N1' of the shifter register 14 are supplied to the NAND gate 23, whose output is outputted to the data bus A1 through the inverter 18. Similarly, the input data A2 stored in the column N2' of the shift register 14 and a value stored in the column N2 of the shifter register 14 are supplied to the NAND gate 22, whose output is outputted to the data bus A2 through the inverter 17. The input data A3 stored in the column N3' of the shift register 14 and a value stored in the column N3 of the shifter register 14 are supplied to the NAND gate 21, whose output is outputted to the data bus A3 through the inverter 16. For instance, the values stored in the columns N1', N2 and N3 are high-level signals, the input data A1 stored in the column N1, the input data A2 stored in the column N2' and the input data A3 stored in the column N3' are outputted to the data bus A1, A2 and A3 respectively.

Figure 7:
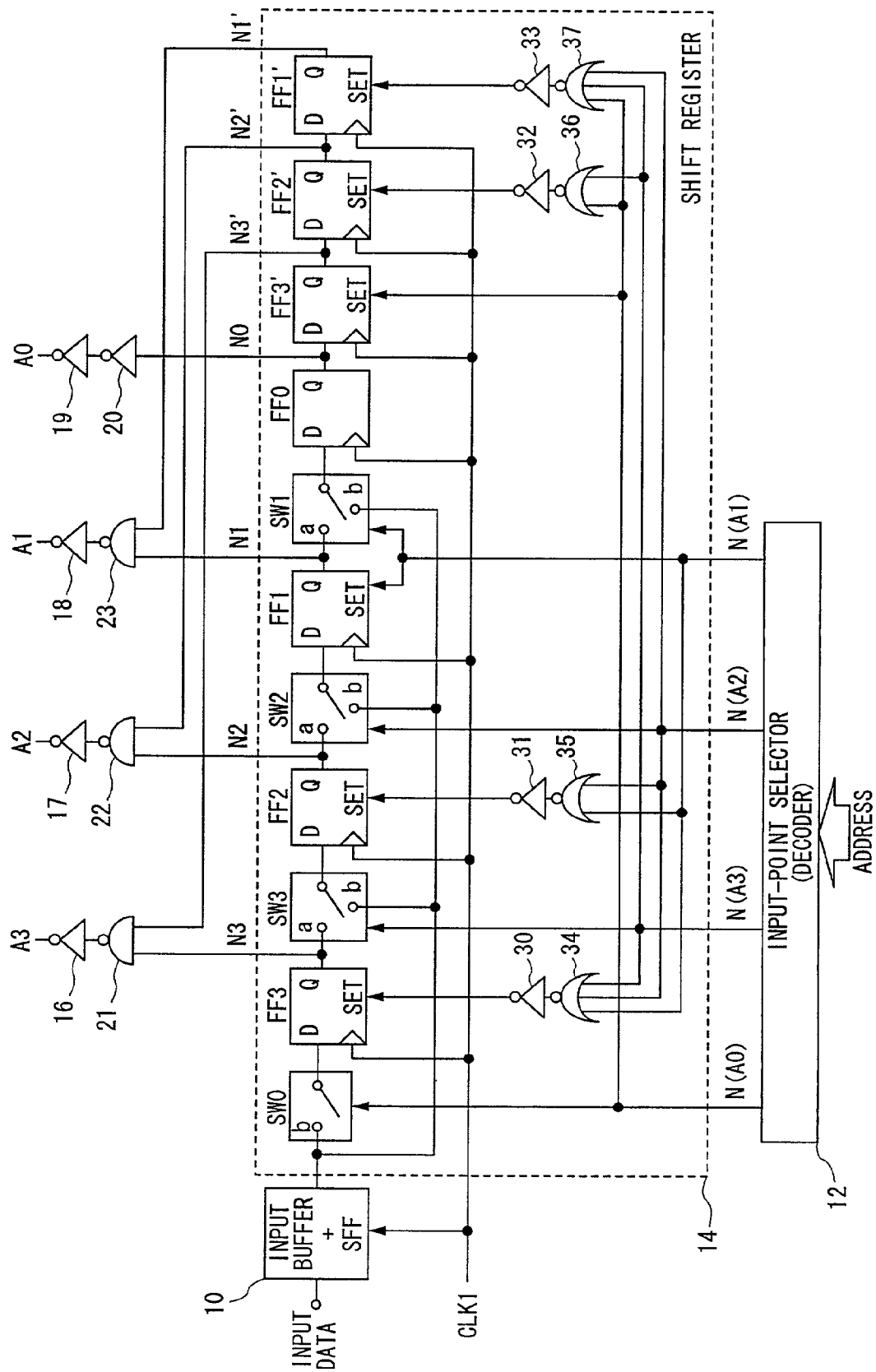
FIG. 7 is a diagram showing a configuration of a shift register, according to the first embodiment.

FIG. 7 is a diagram showing a configuration of the shift register 14, according to the first embodiment. The shift register 14 shown in FIG. 7 includes switches SW0 through SW3, flip-flops FF0 through FF3 and FF1' through FF3', inverters 30 trough 33, and NOR gates 34 through 37. The input-point selector 12 outputs a signal selecting the column N1 of the shift register 14 to the shift register 14 by following the address signal A2 after receiving the address signal A2 and the data-write command as shown in FIG. 6A. To be concrete, the input-point selector 12 outputs a high-level signal from its output terminal N(A2) to the switch SW2 of the shift register 14, and low-level signals from the other terminals N(A0), N(A1) and N(A3) respectively to the switches SW0, SW1 and SW3. The switch SW2 connects to a side "b" after receiving the high-level signal from the output terminal N(A2) of the input-point selector 12. Each of the switches SW1 and SW3 connects to a side "a" after receiving the low-level signal respectively from the output terminals N(A1) and N(A3) of the input-point selector 12. Additionally, the switch SW0 becomes disconnected after receiving the low-level signal from the output terminal N(A0) of the input-point selector 12.

Consequently, the input data A2, A3, A0 and A1 is inputted continuously to the flip-flop FF1 of the shift register 14 through the switch SW2 connected to the side "b", and is shifted one after another toward the flip-flop FF1'. Because of shifting the input data, the shift register 14 stores the input data A1, A0, A3 and A2 respectively in the flip-flops FF1, FF0, FF3' and FF2'. Additionally, the shift register 14 is configured so as to supply a SET signal to the flip-flops FF3, FF2 and FF1', which do not store the input data. When a high-level SET signal is supplied, a flip-flop outputs a high-level signal from its output terminal Q.

According to the first embodiment, the input circuit 1 can select a data input point (a column) of the shift register 14 by following an address signal by use of the input-point selector 12, thereby enabling conversion of supplied serial data to parallel data and output of the parallel data to its corresponding data bus or the like. Additionally, the input circuit 1 includes 2n–1 columns in the shift register 14 in order to generate n-bit parallel data and selecting the data input point among the 2n–1 columns, thereby enabling conversion of supplied serial data to the n-bit parallel data and output of the n-bit parallel data to its corresponding data bus or the like. In the case of including the 2n–1 columns in the shift register 14, columns not storing the supplied serial data are also included in the shift register 14. Thus, the input circuit 1 can obtain the n-bit parallel data by executing a logical arithmetic operation on a combination of data outputted from the columns not storing the supplied serial data and from the columns storing the supplied serial data.

Figure 8:
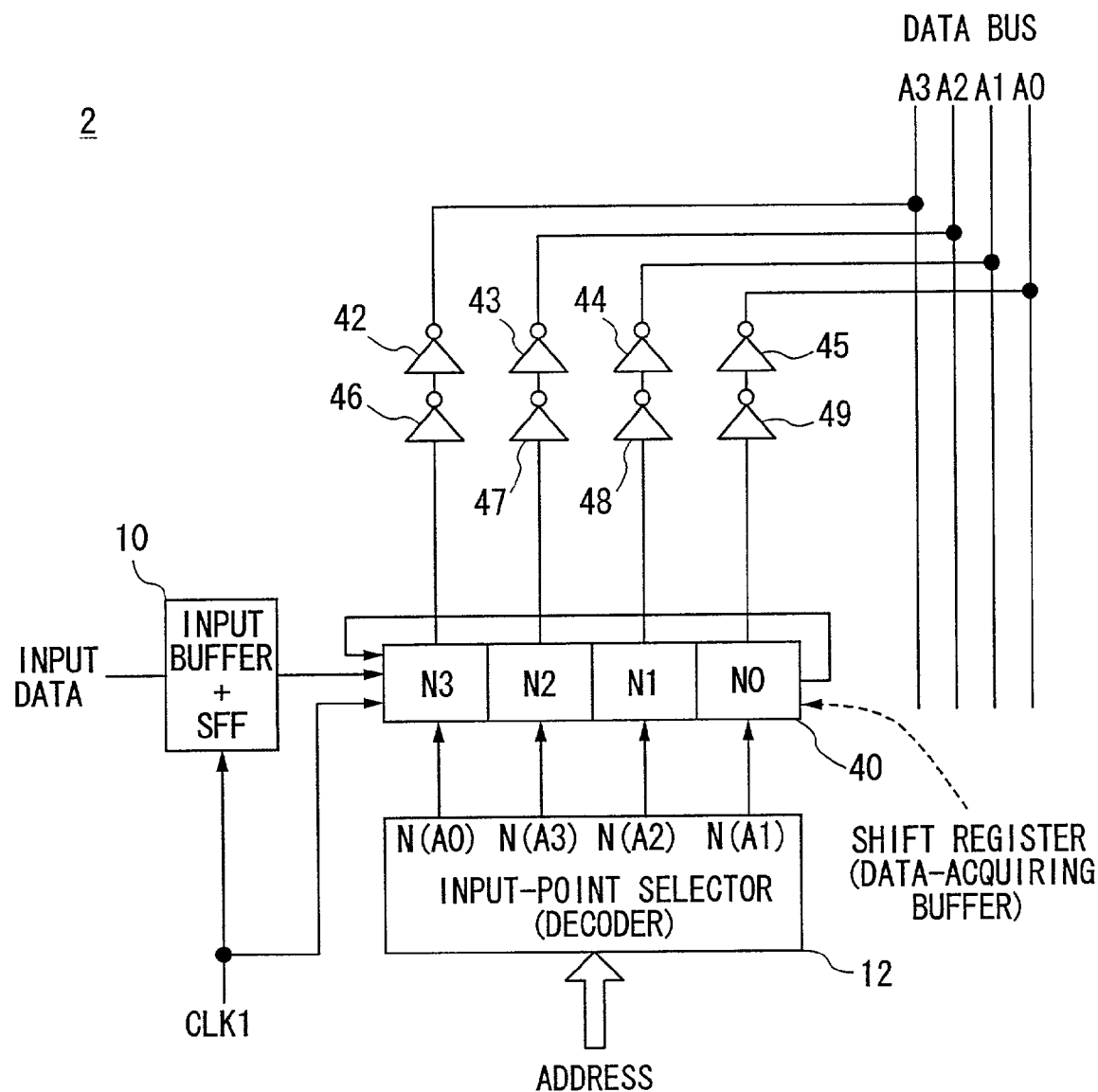
FIG. 8 is a diagram showing a configuration of the input circuit according to a second embodiment of the present invention.

FIG. 8 is a diagram showing a configuration of an input circuit 2 according to a second embodiment of the present invention. The input circuit 2 shown in FIG. 8 includes the input buffer 10, the input-point selector 12, a shift register 40, and inverters 42 through 49. A unit shown in FIG. 8 having the same unit number as a unit shown in FIG. 5 is equivalent to the unit shown in FIG. 5. The shift register 40 includes four columns N3, N2, N1 and N0, and shifts input data in a direction from the column N3 to the column N0. Additionally, the shift register 40 is provided with a feedback loop so that input data shifted to the column N0 is fed back to the column N3 at the next shift. The shift register 40 needs to have $2^n$ columns in which a number "n" is a natural number if a group of $2^n$ address signals is provided thereto. The input-point selector 12 controls a data input point of the shift register 40 by following an address signal inputted thereto similarly to the shift register 14 described in the first embodiment. The column N3 of the shift register 40 is connected to the data bus A3 through the inverters 46 and 42. Similarly, the column N2 of the shift register 40 is connected to the data bus A2 through the inverters 47 and 43. The column N1 of the shift register 40 is connected to the data bus A1 through the inverters 48 and 44. The column N0 of the shift register 40 is connected to the data bus A0 through the inverters 49 and 45. The shift register 40 thus outputs input data stored in the columns N0 through N3 to the data buses A0 through A3 respectively.

FIGS. 9A and 9B are diagrams showing signal processes performed by the input circuit 2, according to the second embodiment. The address signal A2 and the data-write command are supplied to the input circuit 2 as shown in FIG. 9A. The input-point selector 12 selects the column N1 as a data input point of the shift register 40 as shown in FIG. 9A. Subsequently, the input data is supplied to the shift register 40 through the input buffer 10 by following the frequency of the internal clock CLK1 in order of the input data A2, A3, A0 and A1. Since the input-point selector 12 selects the column N1 of the shift register 40 as the data input point of the shift register 40, the input data A2, A3, A0 and A1 is continuously inputted to the shift register 40 from the column N1. The input data A2 initially enters the column N1, and is stored in the column N1. At the next step, the input data A3 enters the column N1, and is stored in the column N1. Meanwhile, the input data A2 is shifted to the column N0, and is stored in the column N0. Subsequently, at the time the input data A0 is entering the column N1, the input data A3 is shifted to the column N0 as well as the input data A2 is fed back to the column N3. Thus, after the input data A2, A3, A0 and A1 is inputted from the column N1 to the shift register 40 one by one, the shift register 40 stores the input data A3, A2, A1 and A0 respectively in the columns N3, N2, N1 and N0. Subsequently, the input data A3, A2, A1 and A0 stored respectively in the columns N3, N2, N1 and N0 of the shift register 40 is outputted respectively to the data buses A3, A2, A1 and A0 through two inverters.

Figure 10:
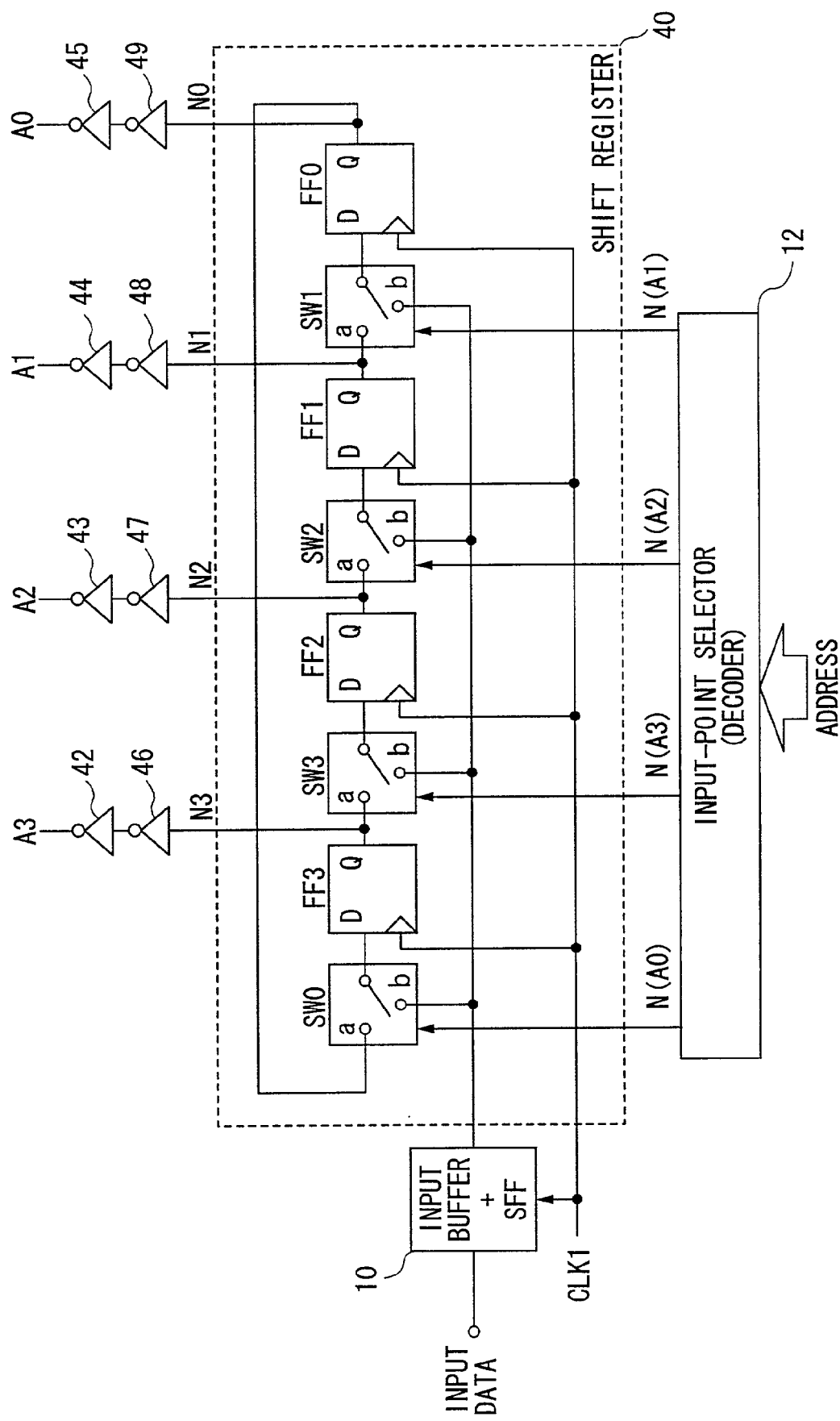
FIG. 10 is a diagram showing a configuration of the shift register, according to the second embodiment.

FIG. 10 is a diagram showing a configuration of the shift register 40, according to the second embodiment. The shift register 40 shown in FIG. 10 includes switches SW0 through SW3, and flip-flops FF0 through FF3. After receiving the address signal A2 with the data-write command as shown in FIG. 9A, the input-point selector 12 outputs a control signal to set the data input point of the shift register 40 to the column N1 by following the address signal A2. To be concrete, the input-point selector 12 outputs a high-level signal (HIGH) from its output terminal N(A2), and low-level signals (LOW) from its output terminals N(A0), N(A1) and N(A3), as shown in FIG. 9A. Since the switch SW2 is connected to the output terminal N(A2) of the input-point selector 12, and receives the high-level signal therefrom, the switch SW2 is connected to a side "b". Additionally, the switches SW0, SW1 and SW3 are respectively connected to the output terminals N(A0), N(A1) and N(A3) of the input-point selector 12, and receive the low-level signal, the switches SW0, SW1 and SW3 are connected to their sides "a".

Accordingly, the input data supplied from the input buffer 10 is inputted to the flip-flop FF1 through the switch SW2 connected to the side "b". Subsequently, the input data A2, A3, A0 and A1 inputted to the shift register 40 from the flip-flop FF1 is shifted in order through the switches SW1, SW0 and SW3, which are connected to the sides "a". Input data stored in the flip-flop FF0 is shifted when new input data is inputted to the flip-flop FF1.

As described above, the shift register 40 can select a data input point by following an address signal supplied with the data-write command, and can output supplied input data to their corresponding data buses. Additionally, the input circuit 2 according to the second embodiment stores input data in all the flip-flops provided in the shift register 40, and thus does not have to provide a SET signal necessary in the fist embodiment to the shift register 40, thereby achieving objects of the present invention with a simpler circuit structure.

Additionally, the input circuit 2 includes a feed-back loop in the shift register 40, and thus does not need to include no more than n columns in the shift register 40 for generating n-bit parallel data.

According to the first and second embodiments, the shift registers 14 and 40 include a plurality of switches and flip-flops, thereby enabling input of serial data to the shift registers 14 and 40 through the plurality of flip-flops.

Figure 11:
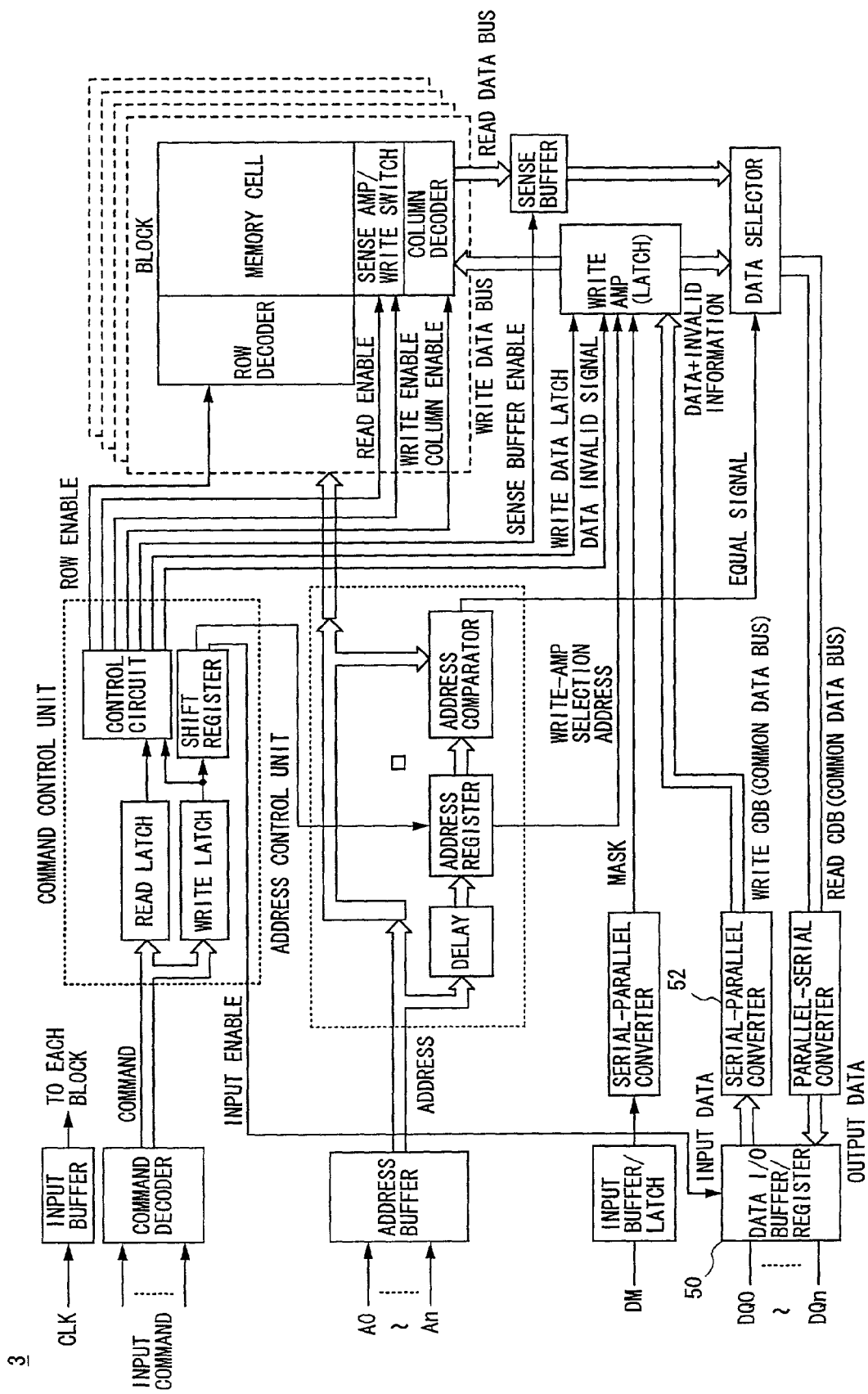
FIG. 11 is a block diagram showing a configuration of a semiconductor device utilizing the input circuit according to the present invention.

FIG. 11 is a block diagram showing a configuration of a semiconductor device 3 utilizing the input circuit 1 or 2 according to the present invention. The semiconductor device 3 shown in FIG. 11 is a SDRAM (Synchronous Dynamic Random Access Memory) utilizing a delayed-write method and the input circuit 1 or 2 according to the present invention. Data inputted to the semiconductor device 3 is supplied to a serial-parallel converter 52 through a buffer/register 50, the serial-parallel converter 52 corresponding to the input circuit 1 or 2. The serial-parallel converter 52 can generate a plurality of address signals from a single address signal supplied in accordance with a command signal, can convert serial data to parallel data, and can output the parallel data to a common data bus. It should be noted that the single address signal necessary for processes performed by the present invention is supplied to the serial-parallel converter 52.

Thus, by applying the input circuit 1 or 2 to the semiconductor device 3, the semiconductor device 3 can reduce its circuit size, and can convert supplied serial data to parallel data speedily as well as can output the parallel data to a data bus.

As describe above, the present invention provides a method of converting serial data to parallel data by inputting the serial data to a data shifting method from a column of the data shifting method determined by use of an address signal, and outputting the parallel data to its corresponding data bus. Therefore, the present invention can provide a data input device speeding up its processing speed with a simplified circuit structure whose circuit size is reduced, and a semiconductor device utilizing the data input device.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-030803, filed on Feb. 8, 2000, the entire contents of which are hereby incorporated by reference.

What is claimed is:

1. A data input circuit converting input serial data to n-bit parallel data, and outputting the n-bit parallel data by following an address signal, said data input circuit comprising:
   a data shifting unit including a plurality of columns, and sequentially shifting the input serial data through the plurality of columns; and
   a selection unit selecting a column among the plurality of columns as an input column by following the address signal, wherein the input serial data is inputted to said data shifting unit through the input column.

2. The data input circuit as claimed in claim 1, wherein said data shifting unit includes 2n−1 columns, and said selection unit selects the input column through which the input serial data is inputted to said data shifting unit.

3. The data input circuit as claimed in claim 2, wherein said data shifting unit executes a logical arithmetic operation on a combination of outputs of n columns storing the input serial data and outputs of n−1 columns not storing the input serial data, thereby converting the input serial data to the n-bit parallel data following the address signal.

4. The data input circuit as claimed in claim 1 wherein:
   said data shifting unit includes n columns, and a feed-back function feeding the input serial data stored in a n'th column of said data shifting unit back to a first column of said data shifting unit; and
   said selection unit selects the input column by following the address signal so as to input the input serial data to said data shifting unit.

5. The data input circuit as claimed in claim 4, wherein said data shifting unit converts the input serial data to the n-bit parallel data following the address signal by outputting the input serial data from the n columns storing the input serial data.

6. The data input circuit as claimed in claim 1 wherein, said input serial data is inputted by n bits to said data shifting unit, and a destination of each bit is determined by the address signal.

7. The data input circuit as claimed in claim 1, wherein:
   said data shifting unit includes a plurality of data storage units as the plurality of columns, and a plurality of switching units controlled by said selection unit, said plurality of data storage units storing the input serial data; and
   said selection unit selects a data storage unit as the input column among the plurality of data storage units by controlling the plurality of switching units.

8. A semiconductor device including a data input circuit converting input serial data to n-bit parallel data, and outputting the n-bit parallel data by following an address signal, said semiconductor device comprising:
   a data shifting unit including a plurality of columns, and sequentially shifting the input serial data through the plurality of columns; and
   a selection unit selecting a column among the plurality of columns as an input column by following the address signal, wherein the input serial data is inputted to said data shifting unit through the input column.

9. The Semiconductor device as claimed in claim 8, wherein:
   said data shifting unit includes a plurality of data storage units as the plurality of columns, and a plurality of switching units controlled by said selection unit, said plurality of data storage units storing the input serial data; and said selection unit selects a data storage unit as the input column among the plurality of data storage units by controlling the plurality of switching units.

10. A method of converting input serial data to n-bit parallel data, and outputting the n-bit parallel data by following an address signal, said method comprising the steps of:

selecting a column among a plurality of columns of a data shifting unit as an input column by following the address signal;

inputting the input serial data to said data shifting unit through the input column; and shifting the input serial data sequentially through the plurality of columns.

* * * * *